(12) United States Patent
Petersson et al.

(10) Patent No.: US 10,681,674 B2
(45) Date of Patent: Jun. 9, 2020

(54) BEAM TRAINING FOR A RADIO TRANSCEIVER DEVICE

(71) Applicant: Telefonaktiebolaget LM Ericsson (publ), Stockholm (SE)

(72) Inventors: Sven Petersson, Sävedalen (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/747,526

(22) PCT Filed: Dec. 18, 2017

(86) PCT No.: PCT/EP2017/083336
§ 371 (c)(1),
(2) Date: Jan. 25, 2018

(87) PCT Pub. No.: WO2019/120746
PCT Pub. Date: Jun. 27, 2019

(65) Prior Publication Data
US 2019/0191411 A1    Jun. 20, 2019

(51) Int. Cl.
| | |
|---|---|
| *H04W 72/02* | (2009.01) |
| *H04W 72/08* | (2009.01) |
| *H04W 72/04* | (2009.01) |
| *H04L 5/00* | (2006.01) |
| *H04B 7/0408* | (2017.01) |
| *H04B 7/06* | (2006.01) |
| *H04B 7/08* | (2006.01) |

(52) U.S. Cl.
CPC .......... *H04W 72/02* (2013.01); *H04B 7/0408* (2013.01); *H04B 7/0617* (2013.01); *H04B 7/0695* (2013.01); *H04B 7/088* (2013.01); *H04L 5/0048* (2013.01); *H04W 72/082* (2013.01); *H04W 72/046* (2013.01)

(58) Field of Classification Search
CPC combination set(s) only.
See application file for complete search history.

(56) References Cited

U.S. PATENT DOCUMENTS

| | | |
|---|---|---|
| 2009/0189812 A1 | 7/2009 | Xia et al. |
| 2010/0056062 A1 | 3/2010 | Zhang et al. |

(Continued)

FOREIGN PATENT DOCUMENTS

| | | |
|---|---|---|
| WO | 2017/048311 A1 | 3/2017 |

OTHER PUBLICATIONS

International Search Report and Written Opinion issued in International Application No. PCT/EP2017/083336, dated Aug. 27, 2018, 19 pages.

*Primary Examiner* — Yee F Lam
(74) *Attorney, Agent, or Firm* — Rothwell, Figg, Ernst & Manbeck, P.C.

(57) ABSTRACT

There is provided mechanisms for beam training. A method is performed by a radio transceiver device. The method comprises performing a beam training procedure by communicating a reference signal in a first set of beams. The method comprises identifying, based on measurements of the reference signal in each of the beams, a second beam to be used for at least one of transmission of data and reception of data. The second beam is not part of the first set of beams.

21 Claims, 7 Drawing Sheets

(56) References Cited

U.S. PATENT DOCUMENTS

| | | | |
|---|---|---|---|
| 2013/0286960 A1* | 10/2013 | Li | H04W 72/042 |
| | | | 370/329 |
| 2015/0326297 A1 | 11/2015 | Petersson et al. | |
| 2016/0095102 A1* | 3/2016 | Yu | H04B 7/0632 |
| | | | 455/452.2 |
| 2016/0380680 A1 | 12/2016 | Yang et al. | |
| 2017/0156067 A1 | 6/2017 | Huang | |
| 2017/0302355 A1* | 10/2017 | Islam | H04B 7/0639 |
| 2017/0302414 A1* | 10/2017 | Islam | H04L 5/0048 |
| 2017/0347276 A1* | 11/2017 | Yu | H04B 7/0617 |
| 2018/0048358 A1* | 2/2018 | Li | H04B 7/0404 |
| 2018/0048442 A1* | 2/2018 | Sang | H04B 7/0617 |
| 2018/0049042 A1* | 2/2018 | Yu | H04B 7/0695 |
| 2018/0049137 A1* | 2/2018 | Li | H04B 17/309 |
| 2018/0191418 A1* | 7/2018 | Xia | H04W 16/28 |
| 2018/0199258 A1* | 7/2018 | Cezanne | H04B 7/0413 |
| 2018/0227094 A1* | 8/2018 | Liu | H04L 5/0048 |
| 2018/0227899 A1* | 8/2018 | Yu | H04B 7/02 |
| 2018/0302888 A1* | 10/2018 | Stirling-Gallacher | |
| | | | H04B 7/0695 |
| 2019/0021096 A1* | 1/2019 | Nilsson | H04B 7/088 |
| 2019/0181935 A1* | 6/2019 | Karjalainen | H01Q 3/24 |
| 2019/0356398 A1* | 11/2019 | Kim | H04B 7/06 |

* cited by examiner

BEAM TRAINING FOR A RADIO TRANSCEIVER DEVICE

CROSS REFERENCE TO RELATED APPLICATION(S)

This application is a 35 U.S.C. § 371 National Stage of International Patent Application No. PCT/EP2017/083336, filed Dec. 18, 2017, designating the United States, the disclosure of which is incorporated by reference.

TECHNICAL FIELD

Embodiments presented herein relate to a method, a radio transceiver device, a computer program, and a computer program product for beam training.

BACKGROUND

In communications networks, there may be a challenge to obtain good performance and capacity for a given communications protocol, its parameters and the physical environment in which the communications network is deployed.

For example, transmission schemes and reception schemes based on the use of narrow beams might be needed at high frequencies to compensate for propagation losses. For a given communication link, a beam can be applied at both the network side (such as at the transmission and reception point (TRP) of a network node) and the user side (such as at terminal devices served by the network node). A beam pair link (BPL) is defined by the beam used by the TRP (denoted TRP beam) for communicating with the terminal device and the beam used by the terminal device (denoted UE beam) for communicating with the TRP. Each of the TRP beam and the UE beam could be used for any of transmission and reception. Likewise, there could be separate BPLs for downlink communications (where the TRP beam is a transmission (TX) beam and where the UE beam is a reception (RX) beam) and uplink communications (where the TRP beam is an RX beam and where the UE beam is a TX beam).

In general terms, a beam management procedure is used to discover and maintain BPLs. A BPL is expected to be discovered and monitored by the network using measurements on downlink reference signals used for beam management, such as channel state information reference signals (CSI-RS). The CSI-RS for beam management can be transmitted periodically, semi-persistently or aperiodic (such as being event triggered) and they can be either shared between multiple terminal devices or be device-specific.

In order to find a suitable TRP beam the TRP transmits CSI-RS in different TRP TX beams on which the terminal devices performs reference signal received power (RSRP) measurements and reports back the N best TRP TX beams (where the value of N can be configured by the network). Furthermore, the CSI-RS transmission on a given TRP TX beam can be repeated to allow the terminal device to evaluate suitable UE beams, thus enabling so-called UE RX beam training.

In further detail, during BPL establishment (e.g. using the example of UE RX beam training for a terminal device with an analog antenna array), it is expected that the terminal device scans through a set of UE RX beams, which typically are narrow pencil beams pointing in different directions, and then selects the UE RX beam out of the set of UE RX beams that gives the highest measured reference signal received power (RSRP). The reason for using narrow beams is that the narrower the beams, the higher the antenna gain. Such narrow high gain beams are especially useful in line of sight channels where the channel angular spread seen by the terminal device is rather small.

It is foreseen that the terminal device could be configured to generate a plurality of different such narrow beams. Evaluating all possible beams during the beam training could therefore be time consuming as well as requiring large amounts of network resources (since one occurrence of the reference signal used must be transmitted from the TRP for each UE RX beam). Therefore a selection has to be made regarding which beams to include in the beam training. Such a selection can result in that the best beams are not used during the beam training. Selecting the best UE RX beam out of the set of UE RX beams evaluated during a UE RX beam training procedure might thus result in the best UE RX beam not being found. The same situation could occur during TRP RX beam training, during UE TX beam training or during TRP TX beam training.

However, there is still a need for improved beam training for radio transceiver devices in a communications network.

SUMMARY

An object of embodiments herein is to provide efficient beam training for radio transceiver devices in a communications network.

According to a first aspect there is presented a method for beam training. The method is performed by a radio transceiver device. The method comprises performing a beam training procedure by communicating a reference signal in a first set of beams. The method comprises identifying, based on measurements of the reference signal in each of the beams, a second beam to be used for at least one of transmission of data and reception of data. The second beam is not part of the first set of beams.

According to a second aspect there is presented a radio transceiver device for beam training. The radio transceiver device comprises processing circuitry. The processing circuitry is configured to cause the radio transceiver device to perform a beam training procedure by communicating a reference signal in a first set of beams. The processing circuitry is configured to cause the radio transceiver device to identify, based on measurements of the reference signal in each of the beams, a second beam to be used for at least one of transmission of data and reception of data. The second beam is not part of the first set of beams.

According to a third aspect there is presented a radio transceiver device for beam training. The radio transceiver device comprises a beam training module configured to perform a beam training procedure by communicating a reference signal in a first set of beams. The radio transceiver device comprises an identify module configured to identify, based on measurements of the reference signal in each of the beams, a second beam to be used for at least one of transmission of data and reception of data. The second beam is not part of the first set of beams.

According to a fourth aspect there is presented a computer program for beam training, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient beam training for the radio transceiver devices.

Advantageously this enables the radio transceiver device that performs the beam training to select a better second beam compared to only selecting one of the beams from the first set of beams as used during the beam training procedure.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
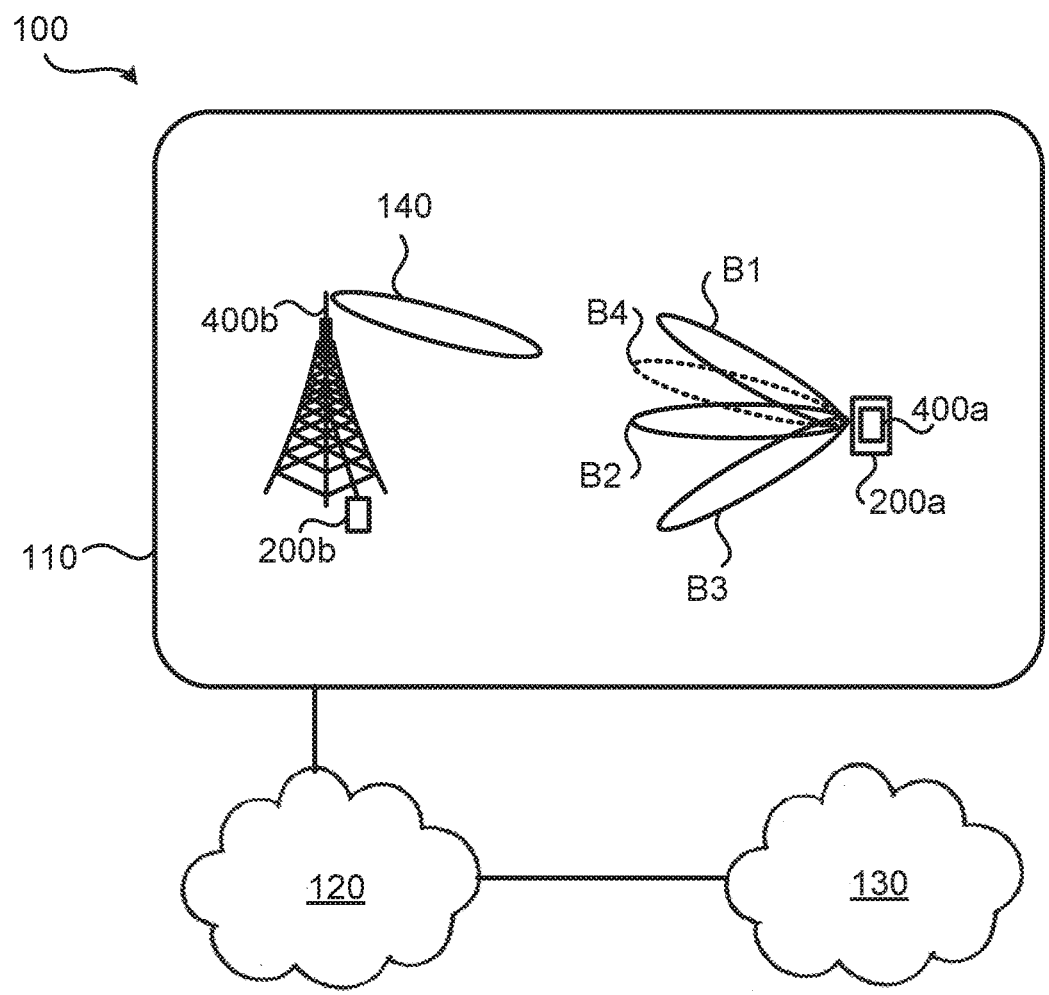
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network 100 comprises a radio transceiver device 200b configured to, via TRP 400b, provide network access to radio transceiver device 200a in a radio access network no. In some embodiments radio transceiver device 200a is part of, integrated with, or collocated with, a terminal device and radio transceiver device 200b is part of, integrated with, or collocated with, a network node, such as a radio access network node. Further, radio transceiver device 200b might comprise TRP 400b, and radio transceiver device 200a might comprise a TRP 400a.

The radio access network no is operatively connected to a core network 120. The core network 120 is in turn operatively connected to a service network 130, such as the Internet. Radio transceiver device 200a is thereby, via the radio transceiver device 200b, enabled to access services of, and exchange data with, the service network 130.

Examples of network nodes are radio access network nodes, radio base stations, base transceiver stations, Node Bs, evolved Node Bs, gigabit Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

Radio transceiver device 200b and radio transceiver device 200a are assumed to be configured to use beam forming when communicating with each other. In FIG. 1 this is illustrated by a beam 140 being used at radio transceiver device 200b, and beams V1, B2, B3, B4 being used at radio transceiver device 200a. The beams could be used for either transmission only, or reception only, or for both transmission and reception.

Figure 2:
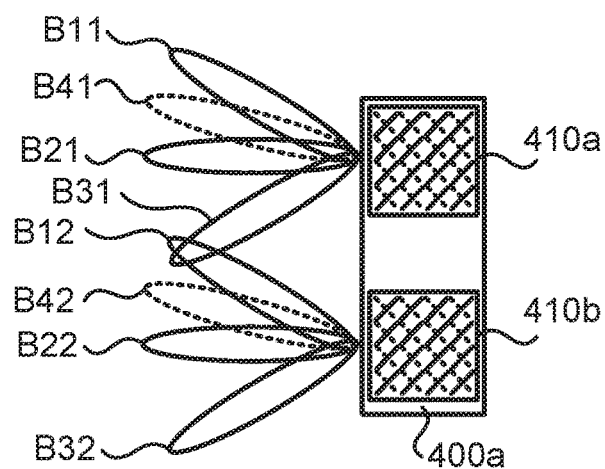
FIG. 2 schematically illustrates a transmission and reception point of a radio transceiver device according to an embodiment.

FIG. 2 schematically illustrates the TRP 400a of radio transceiver device 200a according to embodiments. The TRP 400a comprises a first antenna array 410a and a second antenna array 410b. Generally, the TRP 400a might be assumed to comprise any number of antenna arrays 410a, 410b. That is, the TRP 400a might have only one single antenna array 410a. In turn, each antenna array 410a, 410b comprises antenna elements of either one or two polarizations. The individual antenna elements might for this purpose either be single polarized or dual-polarized. In some aspects the antenna arrays 410a, 410b are analog antenna arrays.

Each antenna array 410a, 410b might belong to a separate panel. In general terms, a panel is a rectangular antenna array of dual-polarized antenna elements with typically one transmit/receive unit (TXRU) per polarization. An analog distribution network with phase shifters might be used to steer the beams of each panel. Multiple panels can be stacked next to each other in the same TRP 400a to increase the maximum number of layers that the TRP 400a can transmit and receive.

As disclosed above, there is a need for improved beam training for radio transceiver devices 200a, 200b in the communications network 100.

The embodiments disclosed herein therefore relate to mechanisms for beam training. In order to obtain such mechanisms there is provided a radio transceiver device 200a, a method performed by the radio transceiver device 200a, a computer program product comprising code, for example in the form of a computer program, that when run on a radio transceiver device 200*a*, causes the radio transceiver device 200*a* to perform the method.

Figure 3:
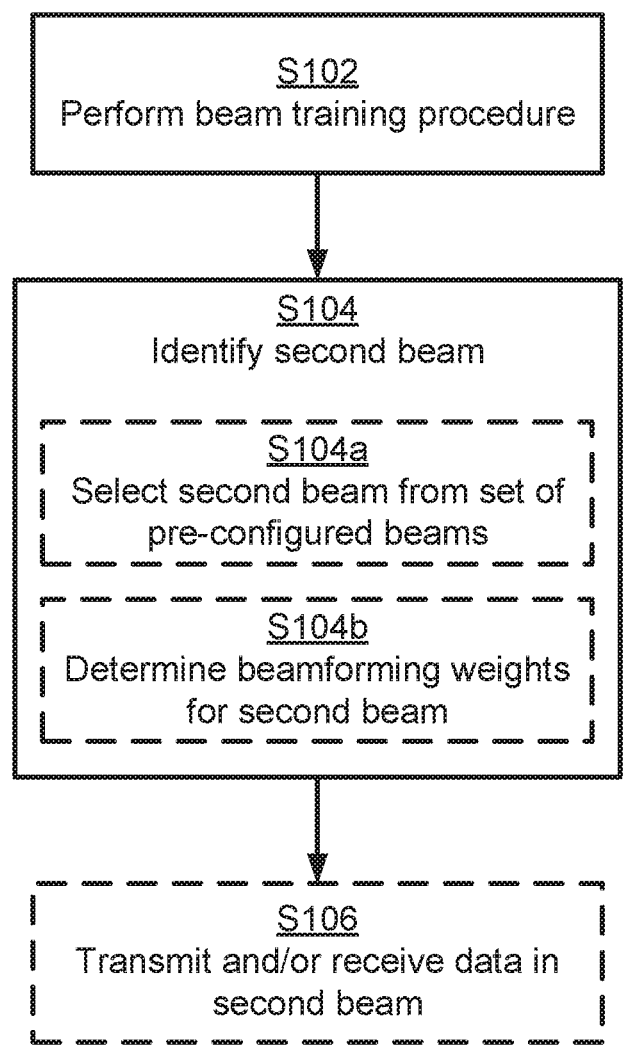
FIG. 3 is a flowchart of methods according to embodiments.

FIG. 3 is a flowchart illustrating embodiments of methods for beam training. The methods are performed by the radio transceiver device 200*a*. The methods are advantageously provided as computer programs 1020. Parallel reference is continued to FIGS. 1 and 2.

It is assumed that radio transceiver device 200*a* performs a beam training procedure. The beam training procedure might be performed periodically or aperiodically. Particularly, radio transceiver device 200*a* is configured to perform step S102:

S102: Radio transceiver device 200*a* performs a beam training procedure. The beam training procedure is performed by radio transceiver device 200*a* communicating a reference signal in a first set of beams (defined by beams B1, B2, B3, or by beams B11, B21, B31, and/or by beams B12, B22, B32).

The measurements are then used by radio transceiver device 200*a* in order to identify a second beam. Particularly, radio transceiver device 200*a* is configured to perform step S104:

S104: Radio transceiver device 200*a* identifies a second beam (beam B4, or beam B41, and/or beam B42). The second beam B4, B41, B42 is identified based on measurements of the reference signal in each of the beams of the first set of beams (i.e., those beams that were used during the beam training procedure). The identified second beam B4, B41, B42 is to be used for at least one of transmission of data and reception of data. The second beam B4, B41, B42 is not part of the first set of beams.

Embodiments relating to further details of beam training as performed by the radio transceiver device 200*a* will now be disclosed.

In some aspects the reference signal is communicated using an analog antenna array of the radio transceiver device 200*a*.

There may be different ways for radio transceiver device 200*a* to identify the second beam B4, B41, B42 as in step S104.

In some aspects the second beam B4, B41, B42 is selected from a set of pre-configured beams. The first set of beams as used during the beam training in step S104 could then be a subset of this set of pre-configured beams. Therefore, according to an embodiment radio transceiver device 200*a* is configured to perform (optional) step S104*a* as part of identifying the second beam B4, B41, B42 in step S104:

S104*a*: Radio transceiver device 200*a* selects the second beam B4, B41, B42 from a second set of pre-configured beams.

In some aspects the second beam B4, B41, B42 is a new beam for which beamforming weights are determined. Therefore, according to an embodiment radio transceiver device 200*a* is configured to perform (optional) step S104*b* as part of identifying the second beam B4, B41, B42 in step S104:

S104*b*: Radio transceiver device 200*a* determines beamforming weights for the second beam B4, B41, B42. The beamforming weights depend on the measurements. That is, the beamforming weights depend on the measurements of the reference signal in each of the beams of the first set of beams.

There could be different ways for radio transceiver device 200*a* to determine whether to perform step S104 or not. In some aspects, step S104 is only performed upon the measurements of the reference signal having passed a comparison to a threshold performance metric value. If the reference signal fails the comparison to the threshold performance metric value, then a beam might instead be identified from the first set of beams B1, B11, B12, B2, B21, B22, B3, B31, B32, and thus without step S104 being entered. Particularly, according to an embodiment the second beam B4, B41, B42 is identified as a result of the measurements of the reference signal having passed a comparison to a threshold performance metric value.

There may be different examples of threshold performance metric values.

In some aspects the measurements are indicative of reference signal received power (RSRP) of the reference signal in each of the beams of the first set of beams. The threshold performance metric value might then be an RSRP value. For example, the measurements might then pass the comparison to the threshold performance metric value only when the measurements indicate an RSRP value higher than the RSRP value defining the threshold performance metric value.

In some aspects the measurements are indicative of channel angular spread for the beams in the first set of beams. The threshold performance metric value might then be a channel angular spread value. For example, the measurements might then pass the comparison to the threshold performance metric value only when the measurements indicate a channel angular spread value lower than the channel angular spread value defining the threshold performance metric value. The channel angular spread might be estimated by analysing the RSRP values for the beams in the first set of beams. In general terms, the more evenly distributed the RSRP values are among the beams in the first set of beams, the higher the channel angular spread is.

Consider again the illustrative example of FIG. 1, where radio transceiver device 200*a* is configured with a beam training procedure, and where radio transceiver device 200*a* evaluates a first set of beams consisting of three beams (denoted B1, B2 and B3). For illustrative purposes, assume further that the RSRP for the respective beams are as follows. For beam B1: −100 dBm, for beam B2: −102 dBm, and for beam B3: −130 dBm. In this case, the RSRP for beam B1 and B2 are almost the same, which means that it is likely that radio transceiver device 200*b* (or at least its TRP 400*b*) is located in an angle somewhere in-between these two beams (unless the channel angular spread is very large). In this case, radio transceiver device 200*a* might thus determine beamforming weights for the second beam (beam B4), such that the second beam points in a direction between B1 and B2, which is likely to improve the RSRP for radio transceiver device 200*a*, unless there already is a second set of pre-configured beams in which the second beam (beam B4) already is a member.

There may be different ways to determine the beamforming weights. In some aspects the beamforming weights are determined so as to maximize the RSRP of the second beam. Particularly, according to an embodiment the beamforming weights are determined according to an RSRP maximization criterion. In this respect, no measurements are made of the RSRP in the beams of the second set of beams and hence, only an estimate of the RSRP for the second beam can be made. This estimate might be based on the measurements of the reference signal in each of the beams of the first set of beams. That is, the beamforming weights of the second beam are then determined such that the second beam points in a direction that corresponds to the estimated maximum RSRP.

In further aspects, the second beam might point in a direction in-between the directions of those two of the beams in the first set of beams having highest RSRP.

Particularly, according to an embodiment the second beam B4, B41, B42 has a pointing direction being in-between the pointing directions of those two of the beams B1, B11, B12, B2, B21, B22 in the first set of beams B1, B11, B12, B2, B21, B22, B3, B31, B32 that have best measurements (such as highest RSRP values). As in the illustrative example of FIG. 2, the second beam B4 has a pointing direction in-between beams B1 and B2. It could therefore be that beams B1 and B2 are those beams of the first set of beams that have best measurements.

Although RSRP and channel angular spread above has given as examples of a quantities that could be measured for the beams, there might be other, or additional, quantities that could be measured for the beams. Particularly, according to an embodiment the measurements are indicative of signal to interference plus noise ratio (SINR) for each of the beams in the first set of beams B1, B11, B12, B2, B21, B22, B3, B31, B32. In some examples radio transceiver device 200a measures both RSRP and interference (as represented by the SINR) for each respective beam during the beam training procedure, and optionally channel angular spread for all the beams during the beam training procedure. Based on the measurements radio transceiver device 200a then selects the second beam aiming to maximize the RSRP and/or SINR, and optionally channel angular spread, for the measurements radio transceiver device 200a.

There may be different types of second beams, regardless if the second beam is selected from a set of pre-configured beams (as in step S104a) or if beamforming weights are determined for the second beam (as in step S104b).

According to an embodiment the second beam B4, B41, B42 has the same shape (such as beam pattern, beam width, etc.) as the beams in the first set of beams B1, B11, B12, B2, B21, B22, B3, B31, B32.

According to another embodiment the second beam B4, B41, B42 has different beam shape than the beams in the first set of beams B1, B11, B12, B2, B21, B22, B3, B31, B32 have.

According to yet another embodiment the second beam B4, B41, B42 has wider main lobe than the beams in the first set of beams B1, B11, B12, B2, B21, B22, B3, B31, B32 have. As a first example, this could be the case where narrow, so-called pencil-shaped, beams are used during the beam training and where the two best beams (for example in terms of highest RSRP or highest SINR) during the beam training are not neighbouring each other (such as beams B1 and B3 in the illustrative example of FIG. 1) due to, for example, transmission and/or reception in the line of sight direction of any intermediate beam (such as beam B2 in FIG. 1) is blocked. As a second example, this could be the case where the channel angular spread is large. For such cases, any gains of using the second beam might be larger if the second beam is wider than the beams for the first set of beams. Generally, this could be the case where the second beam should be robust with respect to movement, blocking, and/or rotation of radio transceiver device 200a. A wide second beam can be generated by only varying the phase settings of an analog antenna array, or by varying both phase and amplitude setting. In case the analog antenna array is dual-polarized, so-called dual-polarized beamforming (DPBF), can be used to generate beams with any beam width (limited only by the physical properties of the antenna array itself).

There may be different ways in which the reference signals are communicated during the beam training in step S102.

In some aspects the reference signals are communicated by being received by radio transceiver device 200a. Particularly, according to an embodiment the reference signals are communicated by being received by radio transceiver device 200a from radio transceiver device 200b. This could typically be the case when the beam training is either for TRP RX beam training or UE RX beam training.

The measurements might then be performed by radio transceiver device 200a itself. That is, according to an embodiment the measurements are performed by the radio transceiver device 200a itself.

In some aspects the reference signals are communicated by being transmitted by radio transceiver device 200a. Particularly, according to an embodiment the reference signals are communicated by being transmitted by radio transceiver device 200a towards radio transceiver device 200b. This could typically be the case when the beam training is either for TRP TX beam training or UE TX beam training.

The measurements might then be performed by radio transceiver device 200b and provided to radio transceiver device 200a in one or more reports. That is, according to an embodiment the measurements are reported to radio transceiver device 200a from radio transceiver device 200b.

As disclosed above with reference to FIG. 2, radio transceiver device 200a (or TRP 400a of radio transceiver device 200a) might have one or more antenna arrays 410a, 410b. Particularly, according to an embodiment radio transceiver device 200a has at least two antenna arrays 410a, 410b. The beam training procedure (as in step S102) and the identifying (as in step S104) of the second beam B41, B42 are then made for each antenna array 410a, 410b. For example, steps S102 and S104 might be repeated, or performed in parallel, for each antenna array 410a, 410b. Thus, the embodiments disclosed herein can be generalized to be used for multiple panels at radio transceiver device 200a, such that a respective second beam is identified at each panel.

Once the second beam has been identified (as in step S104) the second beam might be used for communicating signals, such as data and/or control signals. Particularly, according to an embodiment radio transceiver device 200a is configured to perform (optional) step S106:

S106: Radio transceiver device 200a transmits and/or receives the data in the second beam B4, B41, B42. This, of course, assumes that a switch back to the first beam (as in any of steps S106a, S106b has not (yet) been performed).

There could be different examples of reference signals that are communicated in step S102. Which type of reference signals that are communicated generally depends on the type of radio transceiver device transmitting the reference signals and the type of radio transceiver device intended to receive the reference signals. Particularly, according to an embodiment the reference signals are channel state information reference signals (CSI-RS), sounding reference signals (SRS), sidelink channel state information reference signals (SCSI-RS), or synchronization signal block (SSB) signals. The reference signals are typically CSI-RS or SSB signals when radio transceiver device 200a is a network node transmitting the reference signals or a terminal device receiving the reference signals. The reference signals are typically SRS when radio transceiver device 200a is a terminal device transmitting the reference signals or a network node receiving the reference signals. The reference signals are typically SCSI-RS when radio transceiver device 200a and radio transceiver device 200b are of the same type; for example both being network nodes or both being terminal devices.

Figure 4:
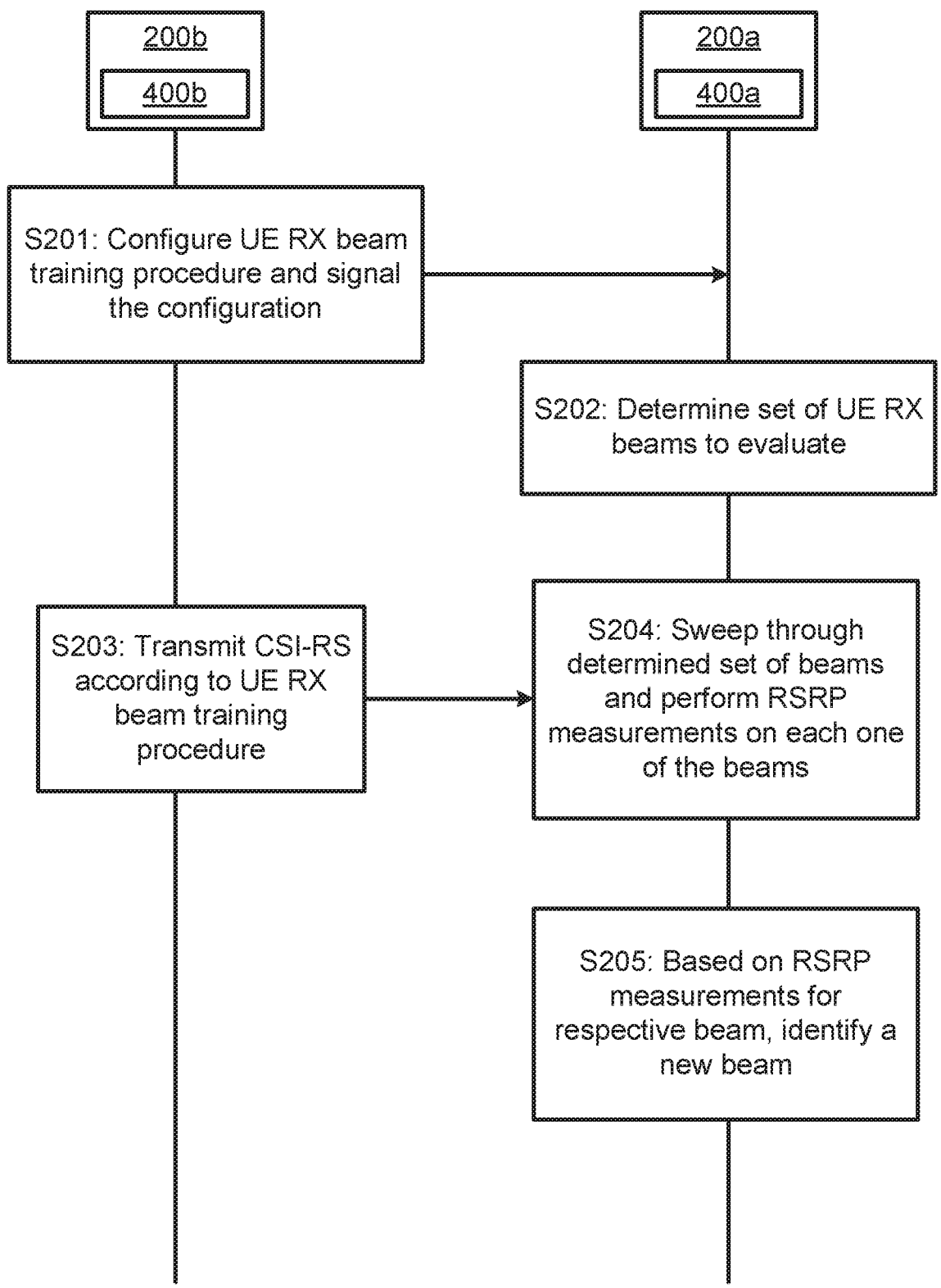
FIG. 4 is a signalling diagram of a method according to an embodiment.

One particular embodiment for beam training as performed by radio transceiver device 200a will now be disclosed with reference to FIG. 4. FIG. 4 is a signalling diagram of beam training as herein disclosed and as applied for a UE RX beam training procedure. Hence, according to this particular embodiment, radio transceiver device 200a is terminal device and radio transceiver device 200b is a network node.

S201: Radio transceiver device 200b configures settings for a UE RX beam training procedure and signals this setting to radio transceiver device 200a.

S202: Radio transceiver device 200a determines which UE RX beams to evaluate during the UE RX beam training procedure.

S203: Radio transceiver device 200b transmits CSI-RSs according to the UE RX beam training configuration.

S204: Radio transceiver device 200a receives the CSI-RS whilst scanning through the determined UE RX beams and performs RSRP measurements on each UE RX beam (and stores the RSRP measurements). One way to implement step S201 is to perform step S102.

S205: Radio transceiver device 200a, based on the stored measurements, identifies a new UE RX beam in order to maximize the RSRP for radio transceiver device 200a. One way to implement step S205 is to perform any of steps S104, S104a, S104b.

Simulations have been performed for an urban macro scenario. The simulation settings are based on agreements in the third generation partnership project (3GPP). The channels are generated for a single dual polarized element at the TRP 400b of the radio transceiver device 200b implemented as a network node for the sake of simplifying the analysis as there will be no need for beam management nor device-specific beamforming at the network node 200b. Channels have been generated for a total of 11400 channel realizations, each channel comprising 48 frequency samples representing different resource blocks (RBs). The subcarrier spacing was set to 15 kHz. The different channel realizations are representative for different radio transceiver devices 200a (implemented as terminal devices) in different locations in the network. The antenna setup used at the TRP 400a of the radio transceiver device 200a implemented as a terminal device comprises four panels, each with a uniform linear antenna array consisting of four dual polarized antenna elements, and with 90 degree difference in pointing direction between adjacent panels.

To mimic a UE RX beam training procedure, several discrete Fourier transform (DFT) beams have been evaluated for each panel at the TRP 400a of the radio transceiver device 200a. The same DFT beam is assumed for both polarizations of respective panel at the TRP 400a. In order to simplify the evaluations, only the best panel will be used at the TRP 400a for each channel realization, where the criterion for best panel is based on received power.

The simulations were based on that radio transceiver devices 200a has x (where x=3, 4 and 5 in the simulations) number of original DFT beams. This setup is also assumed to be used in the reference case). When a certain criterion is fulfilled, the radio transceiver device 200a will change from the current best original DFT beam (representing examples of beams in the aforementioned first set of beams) to a beam of a new set of DFT beams (representing examples of the aforementioned second beam). The new set of DFT beams will be equally many as the original DFT beams and will be pointing in directions in between the original DFT beams.

In the simulations, in order to change beam from the new set of DFT beams from the original set of DFT beams two criterion should be fulfilled. One of the criteria is that the two strongest (in received power) original DFT beams should be located next to each other and differ less in received power than a certain threshold (around 3 dB in the simulations). The second criterion that should be fulfilled is that the third strongest original DFT beam should be more than a certain number of dB worse then the second strongest beam. The reason for this second criterion is to detect that the channel angular spread not is too large. When these two criteria are fulfilled radio transceiver device 200a will switch beam from the original best DFT beam to that of the DFT beams in the new set of DFT beams that points in a direction between the top two strongest original DFT beams.

Figure 5:
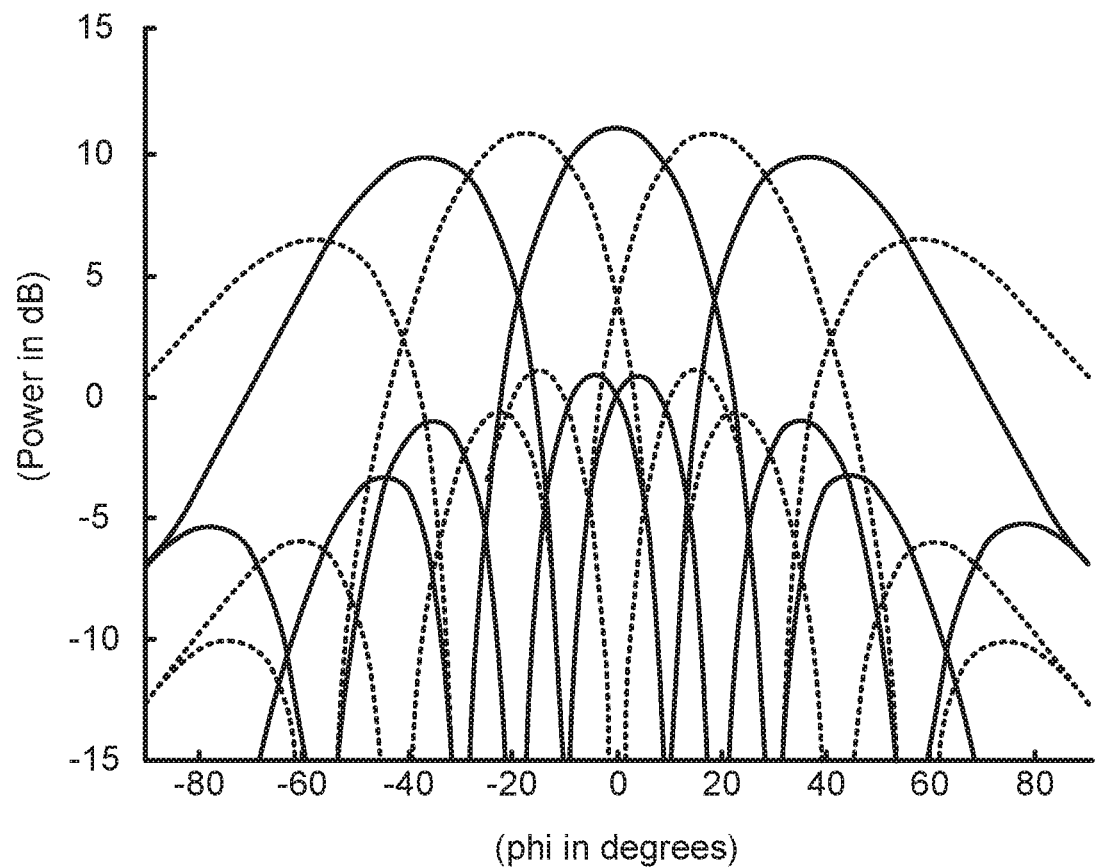
FIGS. 5, 6, and 7 show simulation results according to embodiments.

The beams have been generated with a linear phase front and the pointing directions of the beams being equally distributed in the angular dimension. FIG. 5 gives an example of original DFT beams (solid lines) and the new set of DFT beams (dotted lines).

Figure 6:
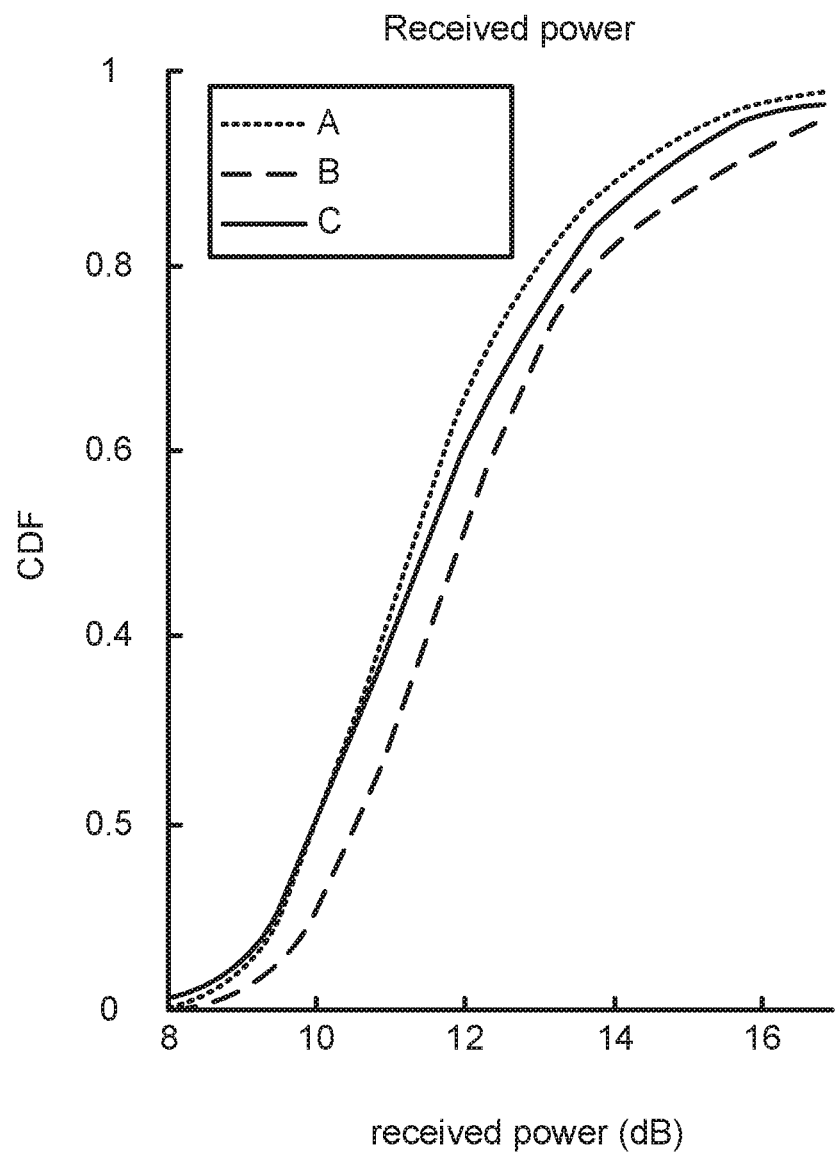

FIG. 6 illustrates the cumulative distribution function (CDF) of received power in dB for the three different simulation cases. Curve A represents a reference case and shows the received power when selecting the best beam only from the original DFT beams. Curve B represents an ideal case and shows the received power when selecting the best beam out of any of the original DFT beams and the new DFT beams. Curve C shows the received power for the proposed method described above. As can be seen, the received power is higher for curve C than for curve A.

Figure 7:
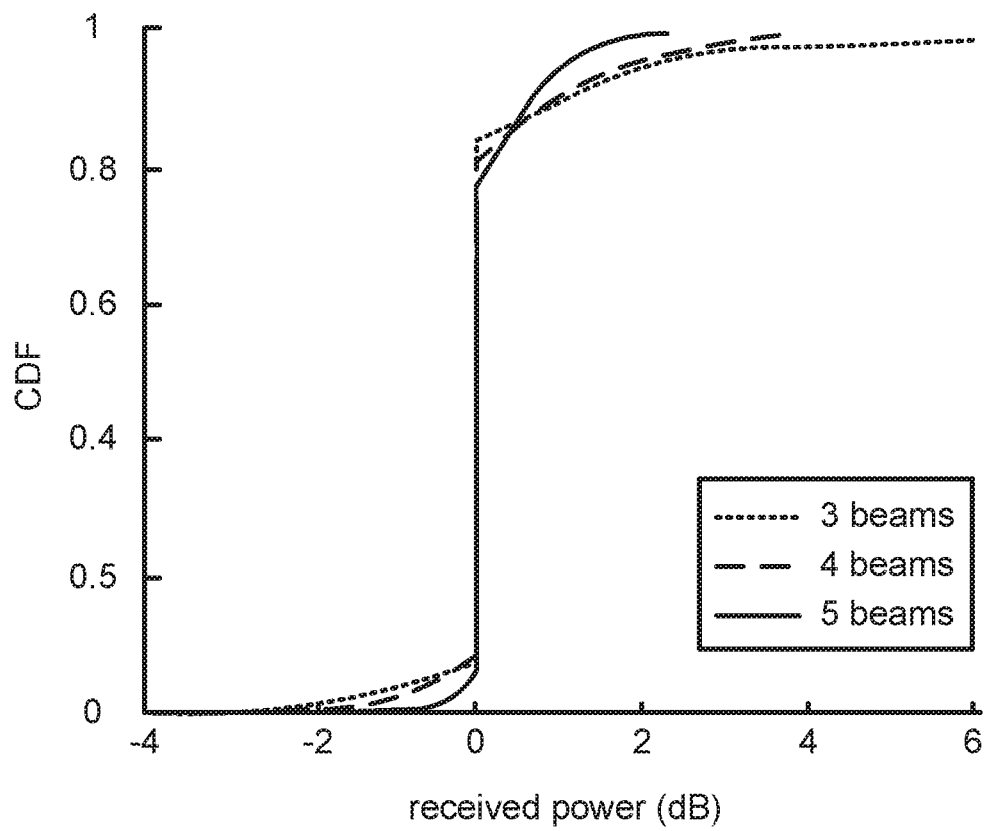

FIG. 7 shows the cumulative distribution function (CDF) of the difference in received power in dB between the proposed method (for a certain setting of the thresholds of the two above-defined criteria) and the reference case. As can be seen, some radio transceiver devices 200a will get worse received power with the proposed method compared to the reference case. However, many more radio transceiver devices 200a will get better received power than the reference case. Most of the radio transceiver devices 200a, about 75%, will not be affected due to the fact that they do not fulfill the two criterion for the used method (see the straight vertical line at 0 dB received power in FIG. 7). The average gain however, when including all radio transceiver devices 200a in the simulation, is 0.2 dB for 3 original DFT beams and 0.15 dB for 4 or 5 original DFT beams. Only about 25% of the radio transceiver devices 200a have been affected by the proposed method, and hence the average gain for those radio transceiver devices 200a that changed their beams is actually four times larger, i.e. 0.8 dB for 3 original DFT beams, and 0.6 dB for 4 or 5 original DFT beams. Further, the channel angular spread in the simulated scenario is comparatively large, which reduces the gains with the proposed method as used in the simulations and reduces the number of affected radio transceiver devices 200a due to the fact that at least one of the two criteria is based on detecting channel realizations with low channel angular spread.

The embodiments have mainly been illustrated with reference to UE RX beam selection in the downlink. However, the embodiments are equally applicable to TRP RX beam selection in the uplink, as well as to TRP TX beam selection in the downlink (where the terminal device performs measurements on each beam and reports the measurements to the TRP).

Further, the embodiments disclosed herein are applicable irrespective of the beamforming hardware structure of radio transceiver device 200a (or its TRP 400a). Thus, while some examples above describe analog beamforming, the embodiments are equally applicable to digital beamforming at radio transceiver device 200a, in which case radio transceiver device 200*b* (or its TRP 400*b*) for RX beamforming would transmit a single reference signal which is simultaneously received in all the beams of the first set of beams (i.e. without the need for radio transceiver device 200*a* to perform a beam sweep).

Figure 8:
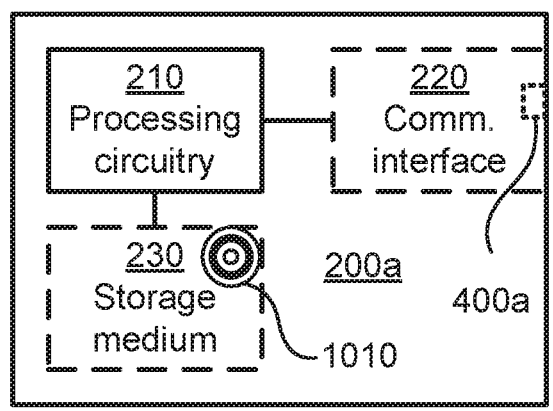
FIG. 8 is a schematic diagram showing functional units of a radio transceiver device according to an embodiment.

FIG. 8 schematically illustrates, in terms of a number of functional units, the components of a radio transceiver device 200*a* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200*a* to perform a set of operations, or steps, S102-S106, S202, S204, S205, as disclosed above. For example, the storage medium 230 may store the set of operations, and the processing circuitry 210 may be configured to retrieve the set of operations from the storage medium 230 to cause the radio transceiver device 200*a* to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200*a* may further comprise a communications interface 220 at least configured for communications with other entities, nodes, functions, and devices of the communications network 100, such as radio transceiver device 200*b*. As such the communications interface 220 may comprise one or more transmitters and receivers, comprising analogue and digital components.

Signals could be transmitted from, and received by, a TRP 400*a* of radio transceiver device 200*a*. The TRP 400*a* could form an integral part of radio transceiver device 200*a* or be physically separated from radio transceiver device 200. The communications interface 220 might thus optionally comprise the TRP 400*a*.

The processing circuitry 210 controls the general operation of the radio transceiver device 200*a* e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200*a* are omitted in order not to obscure the concepts presented herein.

Figure 9:
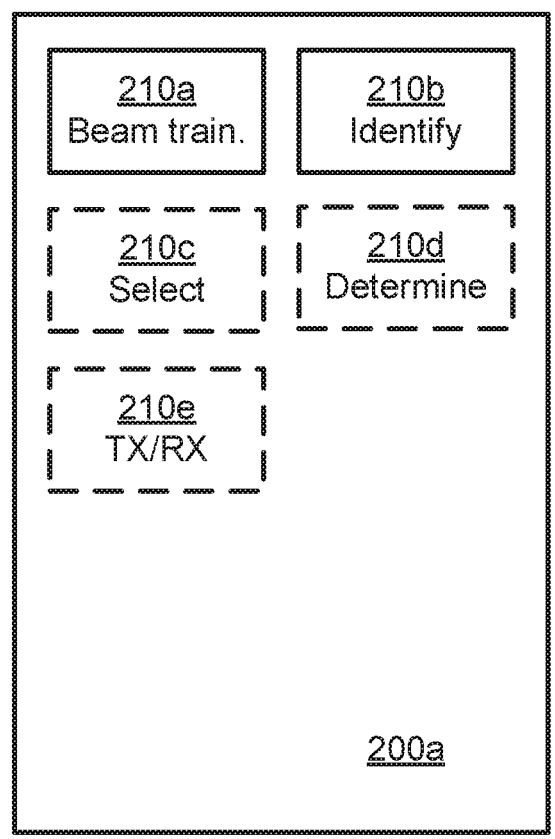
FIG. 9 is a schematic diagram showing functional modules of a radio transceiver device according to an embodiment.

FIG. 9 schematically illustrates, in terms of a number of functional modules, the components of a radio transceiver device 200*a* according to an embodiment. The radio transceiver device 200*a* of FIG. 9 comprises a number of functional modules; a beam training module 210*a* configured to perform step S102, and an identify module 210*b* configured to perform step S104. The radio transceiver device 200*a* of FIG. 9 may further comprise a number of optional functional modules, such as any of a select module 210C configured to perform step S104*a*, a determine module 210*d* configured to perform step S104*b*, and a TX/RX module 210*e* configured to perform step S106. In general terms, each functional module 210*a*-210*e* may in one embodiment be implemented only in hardware and in another embodiment with the help of software, i.e., the latter embodiment having computer program instructions stored on the storage medium 230 which when run on the processing circuitry makes the radio transceiver device 200*a* perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210*a*-210*e* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*e* and to execute these instructions, thereby performing any steps as disclosed herein.

The radio transceiver device 200*a* may be provided as a standalone device or as a part of at least one further device. For example, although radio transceiver device 200*a* typically has been disclosed as being a terminal device, it might equally well be a network node. Thus, functionality of the radio transceiver device 200*a* may be distributed between at least two devices, or nodes. These at least two nodes, or devices, may either be part of the same network part (such as the radio access network or the core network) or may be spread between at least two such network parts.

Thus, a first portion of the instructions performed by the radio transceiver device 200*a* may be executed in a first device, and a second portion of the of the instructions performed by the radio transceiver device 200*a* may be executed in a second device; the herein disclosed embodiments are not limited to any particular number of devices on which the instructions performed by the radio transceiver device 200*a* may be executed. Hence, the methods according to the herein disclosed embodiments are suitable to be performed by a radio transceiver device 200*a* residing in a cloud computational environment. Therefore, although a single processing circuitry 210 is illustrated in FIG. 8 the processing circuitry 210 may be distributed among a plurality of devices, or nodes. The same applies to the functional modules 210*a*-210*e* of FIG. 9 and the computer program 1020 of FIG. 10 (see below).

Figure 10:
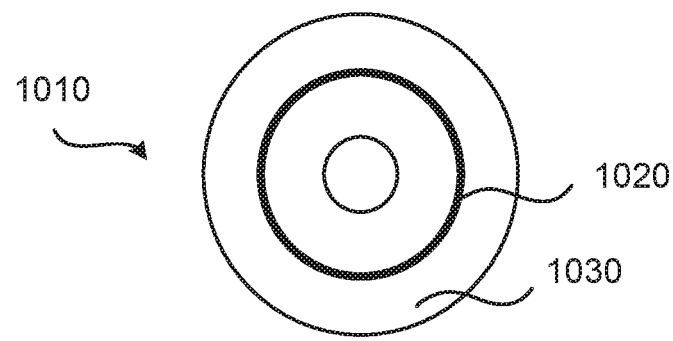
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam training, the method being performed by a first radio transceiver device (RTD), the method comprising:
the first RTD performing a beam training procedure by transmitting a reference signal using a first set of N transmit (TX) beams, wherein transmitting the reference signal using the first set of N TX beams comprises using each one of the N TX beams to transmit the reference signal, wherein the N TX beams comprises a first TX beam and a second TX beam;
the first RTD receiving a first reference signal measurement for the first TX beam, wherein the first reference signal measurement was transmitted by a second RTD;
the first RTD receiving a second reference signal measurement for the second TX beam, wherein the second reference signal measurement was transmitted by the second RTD;
the first RTD selecting, based on the first and second reference signal measurements, a particular TX beam that is not included in the first set of N TX beams; and
the first RTD using the particular TX beam to transmit data to the second RTD, wherein
selecting the particular TX beam based on the first and second reference signal measurements comprises:
i) the first RTD using first and second reference signal measurements to choose the particular TX beam from a second set of pre-configured beams, or
ii) the first RTD using first and second reference signal measurements to determine beamforming weights for the particular TX beam, wherein the beamforming weights depend on the first and second reference signal measurements.

2. The method of claim 1, further comprising, prior to selecting the particular TX beam determining whether the first reference signal measurement exceeds a threshold performance metric value, wherein the selecting step is performed as a result of a determination that the first reference signal measurement exceeds the threshold performance metric value.

3. The method of claim 2, wherein the threshold performance metric value is a reference signal received power value.

4. The method of claim 2, wherein first reference signal measurement is indicative of a channel angular spread for first TX beam, and wherein the threshold performance metric value is an angular spread value.

5. The method of claim 1, wherein the first reference signal measurement is indicative of reference signal received power (RSRP).

6. The method of claim 1, further comprising:
based on the first and second reference signal measurements, declaring the first TX beam and the second TX beam as the best two beams within the first set of beams, wherein
the first TX beam has one pointing direction,
the second TX beam has one pointing direction, and
the particular TX beam that is selected has one pointing direction being in-between the pointing direction of the first TX beam and the pointing direction of the second TX beam.

7. The method of claim 1, wherein the first reference signal measurement is indicative of a signal to interference plus noise ratio for the first TX beam.

8. The method of claim 1, wherein the particular TX beam has same beam shape as the beams in the first set of TX beams.

9. The method of claim 1, wherein the particular TX beam has different beam shape than the beams in the first set of TX beams.

10. The method of claim 1, wherein the particular TX beam has wider main lobe than the TX beams in the first set of TX beams.

11. The method of claim 1, wherein the reference signal is one of: a channel state information reference signal, a sounding reference signal, a sidelink channel state information reference signal, and a synchronization signal block signal.

12. The method of claim 1, wherein the first radio transceiver device has at least two antenna arrays, and wherein the beam training procedure and the selecting of the particular TX beam are made for each antenna array.

13. The method of claim 1, wherein the reference signal is transmitted using an analog antenna array of the first radio transceiver device.

14. The method of claim 1, wherein selecting the particular TX beam based on the first and second reference signal measurements comprises using first and second reference signal measurements to choose the particular TX beam from a second set of pre-configured beams.

15. The method of claim 1, wherein selecting the particular TX beam based on the first and second reference signal measurements comprises: using the first and second reference signal measurements to determine beamforming weights for the particular TX beam, wherein the beamforming weights depend on the first and second reference signal measurements.

16. The method of claim 15, wherein the beamforming weights for the particular TX beam are determined according to a reference signal received power maximization criterion.

17. A first radio transceiver device (RTD) for beam training, the first RTD comprising:
a transmitter;
a receiver; and
processing circuitry coupled to the transmitter and the receiver, the processing circuitry being configured to cause the first RTD:
transmit a reference signal using a first set of transmit (TX) beams, wherein transmitting the reference signal in the first set of TX beams comprises using a first TX beam to transmit the reference signal and using a second TX beam to transmit the reference signal;
process a first reference signal measurement for the first TX beam, wherein the first reference signal measurement was transmitted by a second RTD;
process a second reference signal measurement for the second TX beam, wherein the second reference signal measurement was transmitted by the second RTD;
select, based on the first and second reference signal measurements, a particular TX beam that is not included in the first set of TX beams; and
use the selected particular TX beam to transmit data to the second RTD, wherein the first RTD is configured to select the particular TX beam based on the first and second reference signal measurements by performing a process comprising:
i) using first and second reference signal measurements to choose the particular TX beam from a second set of pre-configured TX beams, or
ii) using first and second reference signal measurements to determine beamforming weights for the particular TX beam, wherein the beamforming weights depend on the first and second reference signal measurements.

18. A computer program product comprising a non-transitory computer readable medium storing a computer program for beam training, the computer program comprising computer code which, when run on processing circuitry of a first radio transceiver device (RTD), causes the first RTD:
transmit a reference signal using first set of transmit (TX) beams, wherein transmitting the reference signal using the first set of TX beams comprises using a first TX beam to transmit the reference signal and using a second TX beam to transmit the reference signal;
process a first reference signal measurement for the first TX beam, wherein the first reference signal measurement was transmitted by a second RTD;
process a second reference signal measurement for the second TX beam, wherein the second reference signal measurement was transmitted by the second RTD;
select, based on the first and second reference signal measurements, a particular TX beam that is not included in the first set of TX beams; and
use the selected particular TX beam to transmit data to the second RTD, wherein
the computer code is configured to cause the first RTD to select the particular TX beam by performing a process comprising:
i) using first and second reference signal measurements to choose the particular TX beam from a second set of pre-configured TX beams, or
ii) using first and second reference signal measurements to determine beamforming weights for the particular TX beam, wherein the beamforming weights depend on the first and second reference signal measurements.

19. A beam training method for selecting a receive (RX) beam, the method being performed by a first radio transceiver device (RTD), the method comprising:
the first RTD receiving a transmitted reference signal using a first set of N RX beams, wherein receiving a transmitted reference signal using a first set of N RX beams comprises using each one of the N RX beams to receive a transmitted reference signal, wherein the N RX beams comprises a first RX beam and a second RX beam;
the first RTD generating a first reference signal measurement for a reference signal received using the first RX beam;
the first RTD generating a second reference signal measurement for a reference signal received using the second RX beam;
the first RTD selecting, based on the first and second reference signal measurements, a particular RX beam that is not included in the first set of N RX beams; and
the first RTD using the particular RX beam for receiving data transmitted by a second RTD, wherein
the first RTD selecting the particular RX beam based on the first and second reference signal measurements comprises:
i) the first RTD using first and second reference signal measurements to choose the particular RX beam from a second set of pre-configured beams, or
ii) the first RTD using first and second reference signal measurements to determine beamforming weights for the particular TX beam, wherein the beamforming weights depend on the first and second reference signal measurements.

20. The method of claim 19, wherein selecting the particular RX beam based on the first and second reference signal measurements comprises: using the first and second reference signal measurements to determine beamforming weights for the particular RX beam, wherein the beamforming weights depend on the first and second reference signal measurements.

21. The method of claim 19, further comprising:
based on the first and second reference signal measurements, declaring the first RX beam and the second RX beam as the best two beams within the first set of beams, wherein
the first RX beam has one pointing direction,
the second RX beam has one pointing direction, and
the particular RX beam that is selected has one pointing direction being in-between the pointing direction of the first RX beam and the pointing direction of the second RX beam.

* * * * *

UNITED STATES PATENT AND TRADEMARK OFFICE
CERTIFICATE OF CORRECTION

PATENT NO. : 10,681,674 B2
APPLICATION NO. : 15/747526
DATED : June 9, 2020
INVENTOR(S) : Petersson et al.

Page 1 of 1

It is certified that error appears in the above-identified patent and that said Letters Patent is hereby corrected as shown below:

On the Title Page

Item (87), under "PCT Pub. No.:", in Column 1, Line 1, delete "WO2019/120746" and insert -- WO2019/120476 --, therefor.

In the Specification

In Column 4, Line 8, delete "network no." and insert -- network 110. --, therefor.

In Column 4, Line 15, delete "network no" and insert -- network 110. --, therefor.

In Column 4, Line 34, delete "V1," and insert -- B1, --, therefor.

In Column 9, Line 58, delete "case)." and insert -- case. --, therefor.

In Column 10, Line 7, delete "worse then" and insert -- worse than --, therefor.

In Column 12, Line 16, delete "to from" and insert -- to form --, therefor.

Signed and Sealed this
Twenty-second Day of September, 2020

Andrei Iancu
*Director of the United States Patent and Trademark Office*